United States Patent [19]
Brantingham et al.

[11] Patent Number: 5,184,525
[45] Date of Patent: Feb. 9, 1993

[54] MECHANISM FOR POSITIONING A CARRIER

[75] Inventors: Charles A. Brantingham, St. Paul; Timothy P. Sheridan, St. Louis Park, both of Minn.

[73] Assignee: The Perkin-Elmer Corporation, Norwalk, Conn.

[21] Appl. No.: 869,561

[22] Filed: Apr. 15, 1992

[51] Int. Cl.$^5$ .......................................... B23Q 17/00
[52] U.S. Cl. ...................................... 74/820; 74/530; 74/816
[58] Field of Search ............. 74/820, 815, 817, 813 R, 74/816, 530

[56] References Cited

U.S. PATENT DOCUMENTS

| | | | |
|---|---|---|---|
| 3,283,782 | 11/1966 | Hague et al. | 74/820 X |
| 3,835,723 | 9/1974 | Martin | 74/820 X |
| 4,606,244 | 8/1986 | Schneemann | 74/816 |
| 4,823,633 | 4/1989 | Pike | 74/530 X |

FOREIGN PATENT DOCUMENTS 200409 5/1983 German Democratic Rep. ... 74/815

OTHER PUBLICATIONS

"Vibration Isolation for Scanning Tunneling Microscopy" by M. Okano, K. Kajimura, S. Wakiyama, F. Sakai, W. Mitzutani and M. Ono, J. Vac. Sci. Technol. A5 (6), 3313–3320 (1987).

Primary Examiner—Rodney H. Bonck
Attorney, Agent, or Firm—H. S. Ingham; E. T. Grimes

[57] ABSTRACT

A mobile component carrier in an instrument includes a disk with a scalloped periphery. A larger bearing and a smaller bearing are mounted on a support structure. The larger bearing has a radius greater, and the smaller bearing has a radius less than that of each of the scallops. The disk is urged into the bearings which have a relative spacing such that the larger bearing seats against two adjacent intersections of the scallops, and the smaller bearing seats against a dished surface between two other adjacent intersections.

7 Claims, 2 Drawing Sheets

MECHANISM FOR POSITIONING A CARRIER

This invention relates to positioning of a mobile carrier of samples or other components in an instrument or the like, and particularly to an apparatus for positioning a mobile carrier linearly and rotationally with high precision.

BACKGROUND OF THE INVENTION

Precision instruments such as a scanning tunneling microscope (STM) generally operate with ultra high vacuum. Positioning and repositioning of samples is carried out remotely and requires high accuracy and special precautions for the in-vacuum procedures. Similarly, repositioning of components of the instrument may require high precision of placement. The STM, for example, can analyze surfaces down to atomic accuracy and has some very small components including a metal probing tip mounted only 0.1 mm above the sample surface. Descriptions of some of the mechanical requirements for a STM are given in an article "Vibration Isolation for Scanning Tunneling Microscopy" by M. Okano, K. Kajimura, S. Wakiyama, F. Sakai, W. Mizutani, and M. Ono, J. Vac. Sci. Technol. A5(6), 3313-3320 (1987).

The probing tips are replaced frequently, preferably without interrupting the vacuum. Therefore, a carrier which is located in the chamber and can carry a number of tips is desirable. In replacing a tip the carrier must be moved to a position adjacent to the tip holder with a considerable degree of accuracy. The carrier may have positions for the tips arranged in a circle so that selection of a tip is effected by a selected orientation of the carrier. Thus the carrier must be positioned linearly into a seated position which also ensures an accurate orientation. Other instruments have similar requirements for positioning. Therefore, an object of the invention is to provide a novel mechanism for precise positioning of a carrier in an apparatus. Another object is to provide such a mechanism which positions linearly as well as rotationally. A further object is to provide such a mechanism which allows selection from among a plurality of rotational positions of the carrier.

SUMMARY OF THE INVENTION

The foregoing and other objects are achieved with a mechanism for precise positioning of a mobile carrier disposed in an apparatus that includes a support structure. The mechanism basically comprises a positioning element, a pair of bearing elements and a means for urging the positioning element into a seating position against the bearing elements. The urging means allows sufficient rotation of the positioning element to effect seating in the seating position at a selected rotational orientation of the carrier. The carrier may be movable to other locations in the apparatus by a translation system.

The positioning element is affixed to the carrier and has a plurality of seating sections located at a constant radius with arcuate spacing about the rotation axis of the positioning element. The pair of bearing elements consists of a larger bearing element and a smaller bearing element with relative spacing therebetween. The bearing elements are mounted on the support structure planar to the positioning element. The larger bearing element has a larger diameter relative to the smaller bearing element having a smaller diameter. The arcuate spacing of the seating sections, and the relative spacing between the larger bearing element and the smaller bearing element, are also selected cooperatively so that, in the seating position, the positioning element is being urged simultaneously against the larger bearing element and the smaller bearing element.

Each seating section includes a pair of seats substantially at a fixed radius from the rotation axis. The seats each has a convex surface facing outwardly from the rotation axis. The seats have a chordal separation chosen so that, with the positioning element being urged against the larger bearing element in the seating position, both seats bear against the larger bearing element.

Each seating section further has an intermediate surface located centrally between the seats. The intermediate surface faces outwardly from the rotation axis at a location radially inward of the seats by a radial increment sufficiently large so that, with the both seats bearing against the larger bearing element in a seating position, there is no contact between the intermediate surface and the larger bearing element.

The diameter of the smaller bearing element, the chordal separation of the bearing elements, and the radial increment, are selected cooperatively so that, with a further seating section of the positioning element being urged against the smaller bearing element in the seating position, an intermediate surface bears against the small bearing element. With the foregoing arrangements and cooperative dimensional selections, the carrier is positioned highly accurately by a three point contact of the positioning element.

Advantageously the plurality of seating sections are located with uniform arcuate spacing about the rotation axis, so as to effect a plurality of seating positions for selected rotational orientations of the carrier. In a preferred embodiment, the positioning element comprises a disk with a scalloped periphery including dished portions each constituting the intermediate surface of a corresponding seating section. Adjacent intersections of the dished portions form the seats of the corresponding seating section.

DETAILED DESCRIPTION OF THE INVENTION

Figure 1:
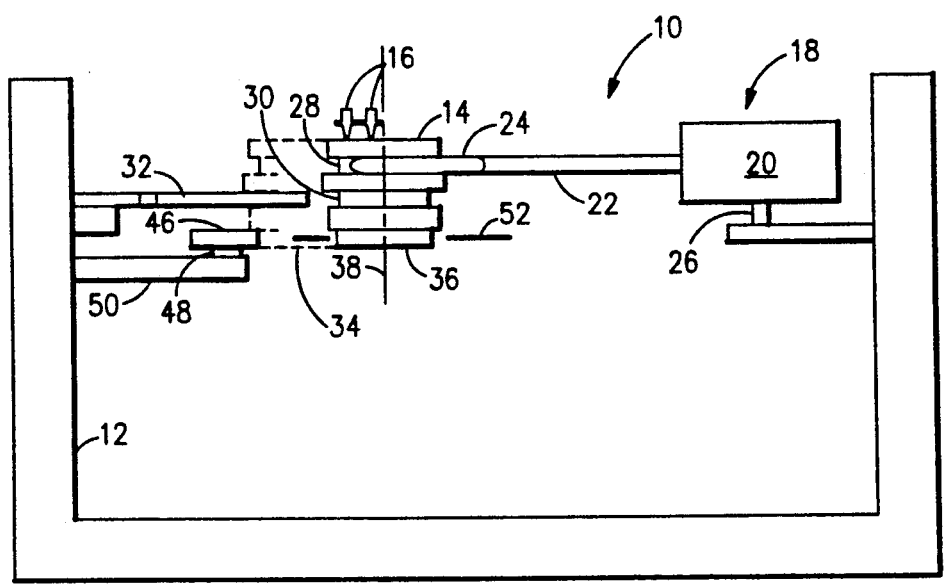
FIG. 1 shows an apparatus incorporating the invention.

FIG. 1 illustrates an apparatus 10 incorporating the invention. The apparatus may be any instrument or other system requiring precise positioning of a component, particularly where several such components are to be positioned selectively. Alternatively the instrument may require precise repositioning of a sample so as to re-analyze a selected target area. An example of such an instrument requiring such precision is a scanning tunneling microscope (STM) where surface analysis is performed at atomic accuracy. However, it will be appreciated that the present invention is applicable to many other instruments and types of apparatus.

The apparatus includes a support structure 12 which is typically utilized for supporting the various components of the instrument. A carrier 14 for holding a sample or positioning a component, such as a source tip 16 of an STM, is disposed generally within the structure. The carrier is mobile, being generally relocatable within the instrument by a translation system 18. The latter may include a linear actuator such as a sealed motor 20 suitable for vacuum, a rod 22 from the motor and a fork 24 for holding the carrier. The actuator may be mounted on a pivot 26 to allow the carrier to be moved over to an interlock or other portion of the instrument.

In the present example the carrier 14 is a cylindrical body with two annular grooves. One groove 28 is engaged With the fork 24 to hold the carrier during translation. The other groove 30 engages a spring yoke 32 which urges the carrier into a seating position 34 (dashed lines) when moved to the position by the translation system 18.

A positioning element 36 is affixed to the carrier 14, on its underside in the present example. The positioning element has a rotation axis 38 and is free to rotate in the yoke spring 32 sufficiently to allow seating into the seating position as explained below. Advantageously a plurality of seating positions are available with selected rotational orientations of the carrier.

Figure 2:
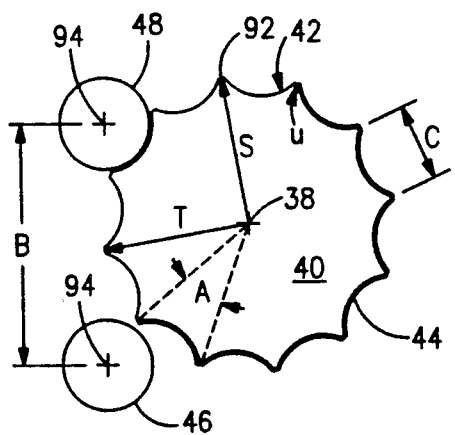
FIGS. 2, 3a, and 3b show positioning with bearing elements having substantially the same radius.

In a preferred embodiment (FIG. 2) the positioning element 36 comprises a disk 40 with peripheral scallops 42 of dished portions 44. The exact number of scallops is not critical, 36 being an example. The carrier is moved so that the disk is urged against a pair of bearing elements 46,48 which are used to precisely position the disk and carrier. This is achieved with the arcuate spacing of the scallops, relative to the spacing between the bearing elements, being such that each element seats in a scallop.

The bearing elements 46,48 may be fixed pins or even hemicylinders for the seating. Advantageously the elements are rotational ball bearings on axes 49 (FIG. 1) to allow smooth seating without significant friction against the disk in a vacuum environment. The bearing elements are mounted on a section 50 of the support structure in the same plane 52 as the disk or other positioning element.

Figure 3A:
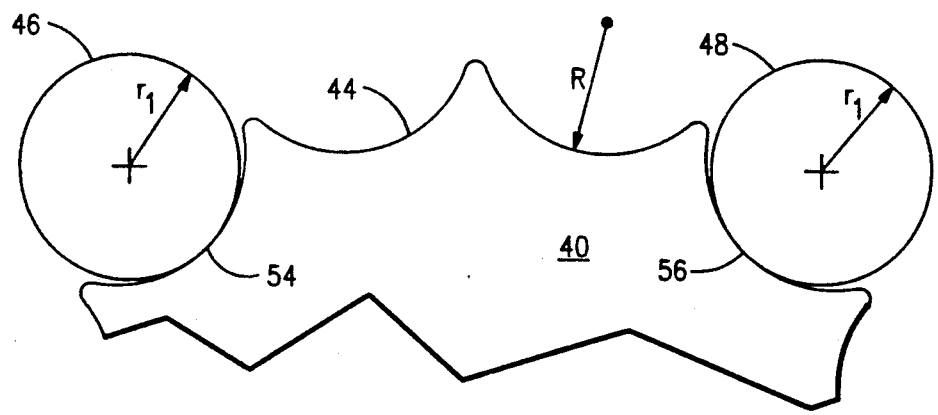
Figure 3B:
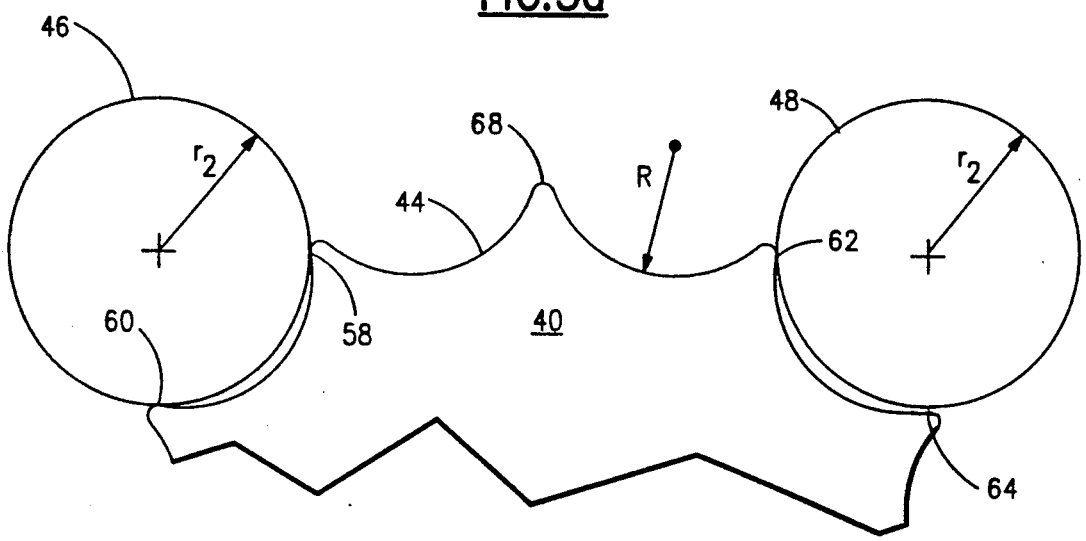

However, unless the apparatus is dimensioned very accurately, the positioning will not ordinarily be precise, as illustrated in FIGS. 3a and 3b. If the bearing elements have marginally smaller radii $r_1$ than the radius R of curvature of the scallops (FIG. 3a), the bearing elements will both bear on surfaces 54,56 within dished portions of the scallops, resulting in only two point (or vertical line) contacts, resulting in poor angular positioning and stability. If the bearing elements have radii $r_2$ marginally larger than the radius R of curvature (FIG. 3b), one element will bear against adjacent intersections 58,60 of the scallops while the other element is likely to contact only one or the other (62) of the adjacent intersections 62,64. As there is randomness as to which intersections will be contacted, positioning is uncertain.

Figure 4:
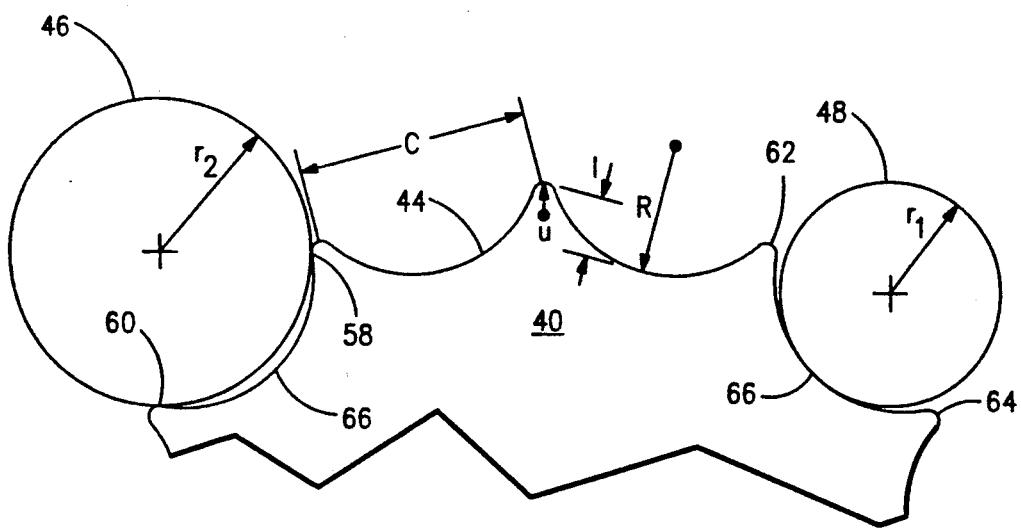
FIG. 4 shows bearing elements according to the invention.

According to the invention (FIG. 4), one bearing element 46 is chosen to have a large radius $R_1$ and the other is chosen to have a small radius $R_2$ relative to the radius of curvature R. Thus the larger bearing will bear against intersections 62,64, and the smaller bearing 48 will bear on the intermediate surface 66 between intersections 62,64. This effects a three point (or line) positioning which can be very precise both in translation and rotation, without requiring more than ordinary dimensional accuracies for the components. For further precision, the intersections should have a bevel 68 to reduce effects of wear of sharp edges.

Figure 5:
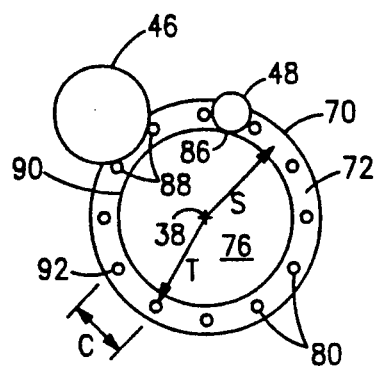
FIGS. 5 and 6 show an alternative embodiment.
Figure 6:
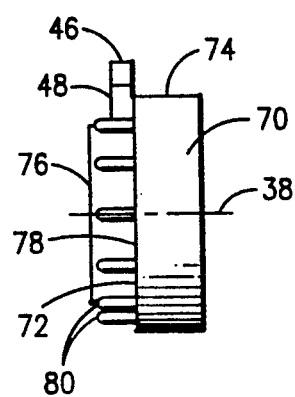

In an alternative embodiment (FIGS. 5 and 6) the positioning element comprises a cylindrical member 70 with an end surface 72 extending radially to the outer periphery 74 of the member. An end step 76 projects axially from the end surface 72 and is bounded radially outwardly by one or more intermediate surfaces 78 located radially within the periphery 74. The intermediate surface 78 may simply be cylindrical (as shown) or may be a series of flat surfaces around the circumference. A series of protrusions such as pins 80 project from the first end surface 72 from positions outward of the intermediate surface 74. In this embodiment the large bearing element 46 will rest on an adjacent pair of pins 88, while the small bearing element 48 rests on an intermediate surface 86 between pins.

In more general terms, each pair of adjacent intersections 58,60 and the intermediate dished portion 66 in the case of the scalloped disk (FIG. 4), or each adjacent pair of pins 88 and intermediate surface 90 in the case of the alternative embodiment (FIG. 5), constitute a plurality of seating sections located at a fixed radius S (FIGS. 2 and 5) in an arcuate spacing configuration about the rotation axis 38. The term "seat" as used herein and in the claims refers to each scallop intersection or protruding pin or the like for resting on the larger bearing element. Thus each seat has a convex surface 92 facing outwardly from the rotation axis. The seats of each section are substantially equally distanced radially (T) from the rotation axis and have sufficiently small radii u and a chordal separation C chosen such that, with the positioning element 36 being urged against the larger bearing element 46 in a seating position, both seats of a seating section bear against the larger bearing element.

Similarly, the intermediate surface, such as the dished portion 44 in the case of the scalloped disk, faces outwardly from the rotation axis at a location radially inward of the seats by a radial increment I sufficiently large so that, with both seats bearing against the larger bearing element 46 in a seating position, there is no contact between the associated intermediate surface 66 and the larger bearing element. For the smaller diameter bearing 48, the chordal separation C and the radial increment I are selected cooperatively so that, with a further seating section of the positioning element being urged against the smaller bearing element in the seating position, an intermediate 66 surface bears against the small bearing element. Finally, the arcuate spacing A (FIG. 2) of the seating sections, and the relative spacing B between centers 94 of the larger bearing element and the smaller bearing element, are selected cooperatively so that, in a seating position, the positioning element is being urged simultaneously against the larger bearing element and the smaller bearing element.

Preferably, as in the case of the uniformly scalloped disk, the plurality of seating sections are located with uniform arcuate spacing A about the rotation axis, so as to effect a plurality of seating positions for selected rotational orientations of the carrier. The orientation selection may be effected with the carrier just pulled away from the seating position, or at another location in the instrument. Code markings could be etched into the carrier surface for observation of orientation, or for recognition by an optical scanner. Such features for effecting reorientation and detection thereof may be conventional and are not within the purview of the present invention.

While the invention has been described above in detail with reference to specific embodiments, various changes and modifications which fall within the spirit of the invention and scope of the appended claims will become apparent to those skilled in this art. Therefore, the invention is intended only to be limited by the appended claims or their equivalents.

I claim:

1. A mechanism for precise positioning of a mobile carrier in an apparatus including a support structure, the mechanism comprising:

a positioning element affixed to a mobile carrier disposed in a support structure, the positioning element having a rotation axis and a plurality of seating sections located at a constant radium with arcuate spacing about the rotation axis;

a pair of bearing elements consisting of a larger bearing element and a small bearing element with relative spacing therebetween, the bearing elements being mounted on the support structure in a plane the same as that of the positioning element, and the larger bearing element having a larger diameter relative to the smaller bearing element having a smaller diameter; and urging means for urging the positioning element into a seating position against the bearing elements while allowing sufficient rotation of the positioning element to effect seating in the seating position at a selected rotational orientation of the carrier, the arcuate spacing and the relative spacing being selected cooperatively so that, in the seating position, the positioning element is being urged simultaneously against the larger bearing element and the smaller bearing element;

each seating section including a pair of seats substantially at a fixed radius from the rotation axis, the seats each having a convex surface facing outwardly from the rotation axis, and further having a chordal separation chosen so that, with the positioning element being urged against the larger bearing element in the seating position, both seats bear against the larger bearing element;

each seating section further having an intermediate surface located centrally between the seats, the intermediate surface facing outwardly form the rotation axis at a location radially inward of the seats by a radial increment sufficiently large so that, with both seats bearing against the larger bearing element in the seating position, there is no contact between the intermediate surface and the larger bearing element; and the smaller diameter, the chordal separation and the radial increment being selected cooperatively so that, with a further seating section of the positioning element being urged against the smaller bearing element in the seating position, an intermediate surface bears against the small bearing element, whereby the carrier is positioned by a three point contact of the positioning element.

2. The mechanism of claim 1 wherein the positioning element comprises a cylindrical member with an end surface extending radially to a periphery, and further comprises a step projecting axially from the end surface and being bounded radially outwardly by each intermediate surface within the periphery, wherein each seat comprises a protrusion projecting form the end surface.

3. The mechanism of claim 1 wherein the plurality of seating sections are located with uniform arcuate spacing about the rotation axis, so as to effect a plurality of seating positions for selected rotational orientations of the carrier.

4. The mechanism of claim 3 wherein the positioning element comprises a disk with a scalloped periphery including dished portions each constituting the intermediate surface of a corresponding seating section, with adjacent intersections of the dished portions forming the seats of the corresponding seating section.

5. The mechanism of claim 4 wherein the intersections are beveled.

6. The mechanism of claim 1 wherein each bearing element comprises a rotational bearing.

7. The mechanism of claim 1 further comprising translation means for translating the carrier with the positioning element into and out of selected seating positions.

* * * * *